United States Patent [19]

Wagenblast et al.

[11] 3,756,442
[45] Sept. 4, 1973

[54] TILTABLE-CONTAINER VEHICLE
[75] Inventors: Ernst Wagenblast, Singen; Heinz Hohlwegler, Gottmadingen, both of Germany
[73] Assignee: Maschinenfabrik Fahr Aktiengesellschaft, Gottmadingen, Germany
[22] Filed: Nov. 19, 1971
[21] Appl. No.: 200,457

[30] Foreign Application Priority Data
Nov. 23, 1970 Germany.................. P 20 57 560.4

[52] U.S. Cl................. 214/314, 214/390, 298/22 B
[51] Int. Cl............................................ B65g 65/04
[58] Field of Search........................... 298/11, 17 B; 214/313, 314, 502, 390

[56] References Cited
UNITED STATES PATENTS
1,294,798 2/1919 Harvey.................................. 298/11
1,464,935 8/1923 Hollnagel............................. 298/11

Primary Examiner—Gerald M. Forlenza
Assistant Examiner—Lawrence J. Oresky
Attorney—Karl F. Ross

[57] ABSTRACT

An agricultural vehicle comprising a bifurcated chassis, each limb of which is formed with a beam pivotally mounted at the free end of the respective chassis limb and carries a respective scissor linkage consisting of a pair of intersecting liks hinged at an intermediate portion. A hydraulic jack between each scissor linkage and the respective limb sections to raise and lower the scissor linkage upon which a container can be mounted. The forward end of each beam is provided with a catch arrangement for locking the scissor linkages at different elevations of the container solely by operation of jacks. The lower end of the longitudinally displaceable link rides in the rail formed by a beam supporting the linkage and carries an articulated control lever selectively engaging detect and operating pins to work the catch.

10 Claims, 7 Drawing Figures

TILTABLE-CONTAINER VEHICLE

CROSS-REFERENCE TO RELATED APPLICATION

This application is related to our applications Ser. Nos. 6,448 and 6,458 filed 28 Jan 1970, now U.S. Pat. Nos. 3,656,644 and 3,637,098 respectively, and to a concurrently filed commonly owned application Ser.No. 200,329.

FIELD OF THE INVENTION

The present invention relates to container-trailer combinations and, more particularly, to agricultural and other vehicles having a container-accommodating trailer with elevatable assemblies such as scissor linkages upon respective limbs of the chassis. More particularly, the invention relates to an arrangement of this type for the removal of a container from a stack, the placing of a container on a stack, the elevation of a container positioned on the ground, the replacement of a container on the ground, and the tipping of a container to dump its contents. The invention also relates to a trailer adapted to be towed by a tractor or like agricultural vehicle for dumping a container and to a mechanism for locking the dumping and elevating mechanism of such a tractor.

BACKGROUND OF THE INVENTION

We and our coworkers have proposed heretofore agricultural and like vehicles for the transportation, elevation and dumping or tipping of containers. For example, in copending application Ser. No. 6,448, mentioned earlier, there is disclosed and claimed a vehicle comprising a bifurcated frame or chassis, a pair of scissor-type linkages mounted on respective beams along the shanks of the frame and tiltable about axes at the free ends of the limbs which are transverse to the direction of movement for tipping a container carried by scissor linkages mounted on these beams. The upper ends of the two intercepting links forming each scissor linkage are designed to engage the container beneath a laterally projecting beam and to secure the container to each linkage by a respective catch. At the lower end of each linkage, one link end may be articulated at a fixed location with respect to the beam while the free end of the other link is able to swing about a respective pivot which is shiftable along the beam. A similar system is disclosed in application Ser. No. 6,458, in which the latch mechanism is described in greater detail.

In both such arrangements, a hydraulic jack is pivotally connected to the limb of the chassis and is articulated to the linkage so that extension of the jack tends to raise the linkage while retraction causes the linkage to collapse. By permitting the beams upon which the linkages are mounted to pivot about horizontal axes transverse to the direction of the vehicle, it has been possible to permit tipping of the container as well. The vehicle has, therefore, many uses. For example, the vehicle may be backed about a container standing on the ground with the linkages in a lower position, whereupon the linkages are raised to engage the laterally projecting rim of the container and/or support pins thereon. The container can thus be lifted from the ground for transport by, for example, a tractor which is connected, as the towing vehicle, to the chassis. Conversely, collapse of the linkages under the control of the hydraulic cylinders may serve to lower the container onto the ground. The system can also be used to elevate the container which is straddled by the vehicle so that the elevated container can be lowered for container stacking. Conversely a stacked container can be lifted off the stack by causing the vehicle to straddle the latter and by raising the scissor linkages.

Finally, in either a collapsed or elevated position, the linkages may be tilted by the hydraulic means when the unpivoted or free end of the guide beams carrying the scissor linkages are released so as to tilt.

We may also mention that among these earlier systems are arrangements of the aforedescribed type wherein the container could be fixed or positioned at various elevations. For example, some of these systems provided a locking of the scissor linkages at elevated positions whereby the full weight of the container was applied to the hydraulic fluid in a static condition. Aside from the linkage difficulty which this created, such systems were disadvantageous because of unreliability and were expensive to construct because of the larger dimensions and hydraulic safety attachments which were required. It will be apparent that the problem is compounded by the fact that the container may have to be maintained in an elevated position for long durations and in a fully loaded state so that the container weight is applied via the hydraulic system to the fluid over a prolonged period. It should also be noted that mechanical locking or indexing systems for securing the scissor linkages in elevated positions required manual operation or complex actuating devices and were not satisfactory for this purpose.

OBJECTS OF THE INVENTION

It is, therefore, the principal object of the invention to provide, in a vehicle of the character described, an improved mechanism for automatically locking the elevating linkages at various levels solely by manipulation of the hydraulic system.

Another object of the invention is to provide an agricultural more like trailer-type vehicle with an improved system for raising and lowering a container straddled by the vehicle chassis.

Still another object of the invention is to provide an improved indexing means for securing a container, on a vehicle adapted to raise, lower and tilt the container, in selected elevational positions automatically by actuation of the lifting mechanism and without maintaining any undue pressurization over long periods.

Still another object of the invention is to provide a system of the character described whereby the aforementioned disadvantages can be avoided and the height of the container can be established at selected levels without back pressurization of the lifting mechanism and solely by the operation thereof.

SUMMARY OF THE INVENTION

These objects and others which will become apparent are attained, in accordance with the present invention, in a container-transport vehicle which comprises, in the manner described above, a bifurcated vehicle chassis having a pair of limbs whose rear free ends are provided with wheels engaging the ground and whose front ends may be connected to the tow bar of an agricultural tractor or like towing vehicle having a source of hydraulic fluid and control means, e.g., valves, therefore. On the limbs of the chassis, which is designed to straddle a container on the ground or a stack of such containers, there are provided respective beams or bars which are pivoted about fixed axes to the free ends of the limbs and can be raised and lowered by the elevating mechanism for tilting or dumping of a container. These bars carry respective linkages or elevating assemblies, preferably in the form of scissor linkages, the upper ends of which may engage beneath a laterally projecting rim of the container. Preferably, each scissor linkage comprises a pair of intersecting links hinged together at an intermediate location therealong and adapted to flank the container. The lower end of one of these links is preferably articulated to its beam at a fixed pivot at one end thereof while the lower end of the other link of each scissor linkage is pivotable with respect to the beam and is longitudinally shiftable thereon. Similarly, the upper end of one of the links of each linkage may be longitudinally shiftable beneath the laterally projecting rim of the container while the upper end of the other link is pivotal with respect to the container but is longitudinally fixed with respect thereto. The elevating means advantageously comprises a hydraulic jack, one end of which is articulated to the respective chassis limb while the other end of the jack is secured to one ot the links of the linkage. Thus, upon extension of the jack with the linkage locked to the beam, a tilting movement of the linkages about the aforementioned horizontal axes is generated. When, however, the links are not locked to the beam, extension of the hydraulic jack elevates the container on the linkage. Contraction of the hydraulic jack can be used to swing the container downwardly from a tilted position or to lower the container from an elevated position. Thus the system is particularly suitable for the lifting of a container, for setting a container down, for elevating a container from the stack, for lowering a container onto the stack, and for tilting a container.

According to the present invention, means are provided at the lower ends of each linkage for locking the elevating assemblies, i.e., the scissor linkages in selected positions of elevation solely by operating the hydraulic systems and for supporting the load represented by the container and its contents, without back-pressurization of the hydraulic system. The last-mentioned means may comprise, according to a specific feature of the invention, an outer slider which is longitudinally shiftable along the beam or bar of the respective linkage which is preferably formed with a guide rail for a roller carried by the lower end of one of the links. This outer slider cooperates with a control plate which coacts with selected locking hooks of the chassis spaced apart in the longitudinal direction therealong.

The latching mechanism, according to the present invention, which is actuated solely by manipulation of the hydraulic jack, comprises further a releasing pin mounted upon but longitudinally shiftable along the guide rail which engages the longitudinally movable end of the scissor linkage. This release pin forming part of an indexing means cooperating with movable link end, is displaceable against the force of a spring. The pin, moreover, is coupled with the inner slider, the latter being operatively connected with the outer slider by a spring interposed between them. Upon de-energization of the hydraulic jack, therefore, under the weight of the container a control member pivotally connected or articulated to the lower end of the longitudinally shiftable link is provided to engage or disengage from the release pin and thereby control the locking of the system to the chassis hooks. The free end of this control member is formed with a concave seat lying substantially at right angles to the longitudinal direction for engagement with the release pin and one or more indexing pins, but is shielded with a spring-biased pawl against admitting the pins to the recess during lowering movement of the scissor linkages without a slight upward motion. The release of the connection between the longitudinally extending beams and the chassis takes place at least in part by a reduction of the friction forces during this elevating motion of the linkage which causes an upward component to be applied by the linkage to the longitudinal beam.

The control member, which bears upon the release pin at the lower end of the linkage, is swingably mounted to this linkage about a pivot whose axis is transverse to the direction of travel of the vehicle and has the aforementioned concave socket or seat at its free end which lies approximately at right angles to a lower edge of this member and to the longitudinal direction. The spring-loaded finger pivoted on the free end of this control member may have a nose extending somewhat below this edge for engagement of the pins in a recess-unblocking movement when the control member is moved in a direction corresponding to container elevation. The opposite side of the finger may be curved to form a cam by means of which the control member is guided over the pins.

DESCRIPTION OF THE DRAWING

The above and other objects, features and advantages of the present invention will become more readily apparent from the following description, reference being made to the accompanying drawing in which.

SPECIFIC DESCRIPTION a. General Description of the Vehicle

Figure 1:
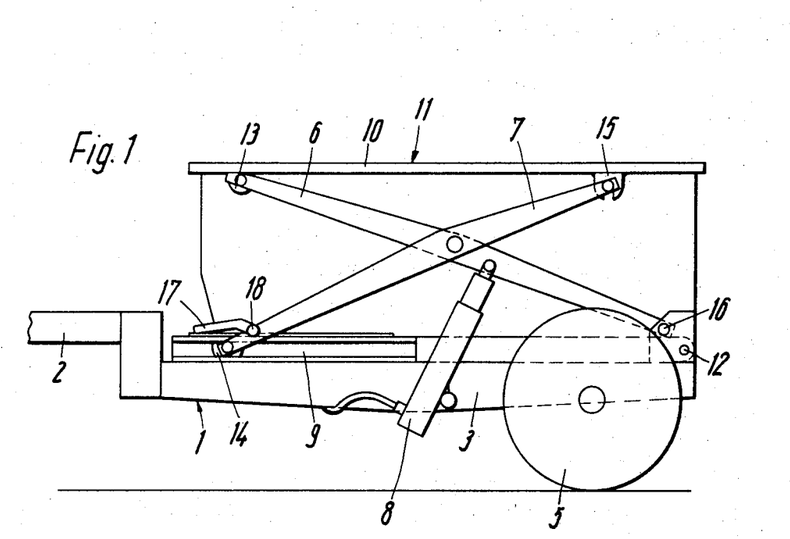
FIG. 1 is a diagrammatic elevational view showing the vehicle of the present invention carrying a container.

As can be seen from FIG. 1, the diagrammatically illustrated agricultural container-transport vehicle comprises a trailer frame 1 having a pair of longitudinally extending limbs 3, the free ends of which are supported on the ground by wheels 5. The front ends of the limbs merge into a bight from which a towing tongue 2 extends for articulation to the towing bar of a tractor. The bifurcated frame 1 permits the vehicle to be backed up to and to straddle a container 11 which can be elevated, lowered, stacked or tilted as will be apparent hereinafter.

Each frame limb 3 is provided with a longitudinally extending bar 9 which is pivotally mounted on the limb for rotation about a horizontal axis perpendicular to the direction of travel of the vehicle on a pivot 12. The limbs each also carry an elevating assembly which is here shown to be a scissor linkage consisting of intersecting links 6 and 7, pivotally connected together at an intermediate location.

The container 11 has a laterally projecting rim 10 which is provided at its rearward end with a downwardly open fork 15 adapted to receive a support pin carried by the upper end of link 7. The upper end of link 6 is formed with a roller 13 adapted to engage the underside of the rim 10 with freedom of longitudinal motion. Hence one link end is detachably articulated to the container at 15 but is not longitudinally displaceable relative thereto while the other limb end bears upon the underside of the rim with freedom of angular and longitudinal movement.

At its lower end, the linkage includes a pivot 16 at which the link 6 is articulated to the free end of the limb 3 and is not free to move longitudinally relative to the chassis 1. The pivot 16 is preferably located close to the pivot 12 and permits swinging motion of the link 6 about an axis perpendicular to the direction of travel of the vehicle.

The lower end of link 7 is formed with a roller 14 (FIGS. 1 and 4) which rides in a laterally open rail formed by the beam 9. Thus the lower end of link 6 is angularly and longitudinally shiftable relative to the beam.

A hydraulic jack 8, articulated to each limb 3 of the chassis, has a piston pivotally secured to the linkage at the link 6. Extension of the jack is thus able to raise the linkage or tilt the container. The hydraulic system of the tractor, including a control valve for raisong (actuating) or lowering (depressurizing) the hydraulic jack may be coupled to the latter by a hydraulic line.

The basic structure described has several modes of operation. Firstly, with the upper ends of the links 6 and 7 lying below the level of the rim 10, the vehicle can be backed to bring a container standing on the ground into the open rear end of the trailer so that the limbs 3 and the linkages 6, 7 straddle the container. The hydraulic jack may then be extended to elevate the linkage 6, 7 and bring the upper end of link 7 into engagement with the bifurcation 15 and thereby lift the container from the ground into the transport position shown in FIG. 1. The link can be raised further to elevate the container and thereby permit stacking of at least two such containers one upon the other. When the free end of bar 9 is released from the limb 3, operation of the hydraulic cylinder can swing the bars about their axes 12 to dump the contents of the container. The weight of the container may be used to lower the jack when the pressure is relieved.

b. General Description of Locking Mechanism

Each of the limbs 3 is provided with a plurality (e.g., two) of forwardly facing hooks 4 and 4' (see FIGS. 2 and 7) which are welded to the upper surfaces of the limbs and are longitudinally spaced apart therealong. These hooks form part of a locking mechanism adapted to secure the rail releasably to the frame when tilting movement is not desired.

At approximately 10 to 20 cm from the forwardmost end of the link 7, there is articulated a control member 17 for swinging movement about an axis perpendicular to the direction of travel of the vehicle and perpendicular to the plane of the linkage. This axis is represented at 18 in FIG. 2. The control member 17 is provided with an abutment portion 19, the forward end of which is formed with a concave seat 20 for a pin as will be described in greater detail hereinafter. The control member 17, is, moreover, of inverted U cross section to accommodate members 19 and 20, the latter being a recess extending transversely to the longitudinal direction. The housing 21 also accommodates between its flanges a latching pawl 22 in the form of a bellcrank lever biased in a counterclockwise sense about a fulcrum 22' extending parallel to the axis 18 by a spring 23 one end of which is anchored to the housing 21 while the other end engages the control portion of the detent pawl 22. Release of the pawl 22 causes the nose 24 to swing into engagement with the seat 20 (FIG. 5) in which position the nose 24 projects below the bottom of the seat 20 by a distance represented by x in this Figure. Thus when the control lever 17 is shifted to the right, the nose 24 can engage the indexing and operating pins to be described in greater detail hereinafter. This distance x may be about 10 mm.

Figure 5:
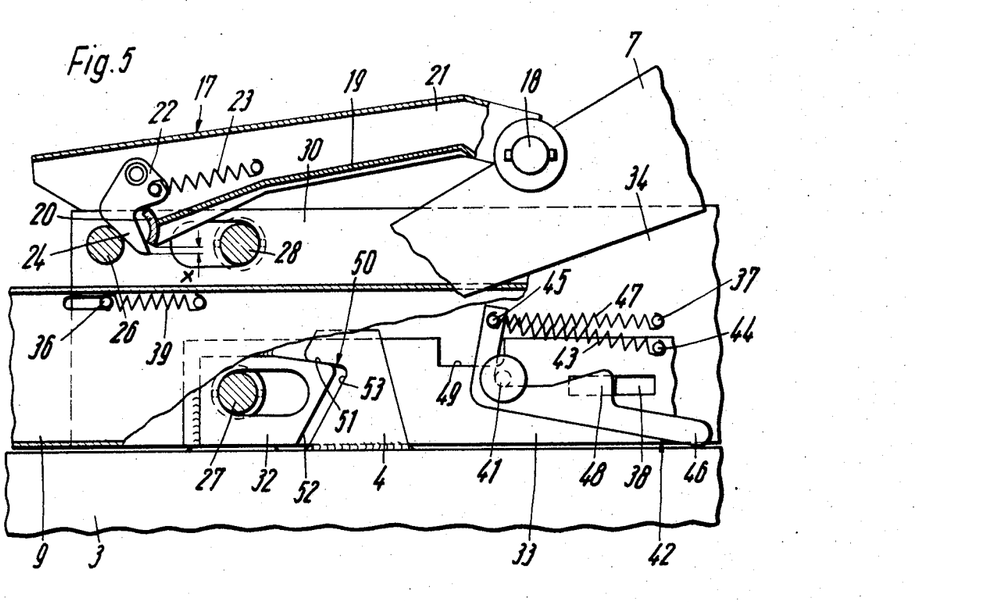
FIGS. 5 – 7 are cross sections corresponding to FIG. 3 but showing other operating positions of the elements of the present invention.

The pawl 22 is so constructed and dimensioned that its back edge, when the pawl lies against the seat 20, forms a rearwardly open acute angle with the longitudinal axis of the member 17, thereby allowing the pawl to ride over and lift the control lever 17 over the indexing and operating pins when the link member 7 is guided in its forward direction (to the left) in the rail 9 (FIG. 5).

As noted, the pin-receiving seat 20 extends approximately transversely or at right angles to the longitudinal axis of the control member 17 so that it includes approximately a right angle with the limiting lower edge 25 of the housing 21. The control member 17, which is articulated to the link 7, serves to actuate the lock arrangement which releasably secures the beam 9 to the limb 3. This locking mechanism comprises three pins which are mounted upon the rail 9 and including an indexing pin 26 and a pair of spaced-apart guide pins 27 and 27' as well as a pair of longitudinally shiftable release or operating pins 28 and 29 which are spaced apart along the rail and parallel to the longitudinal direction. The term "longitudinal direction" as used herein is intended to refer to a direction parallel to the limbs 3, the direction of travel of the vehicle, the beams or rails 9 when the latter rest upon the limbs, and the direction of movement of the lower ends of links 7.

Figure 4:
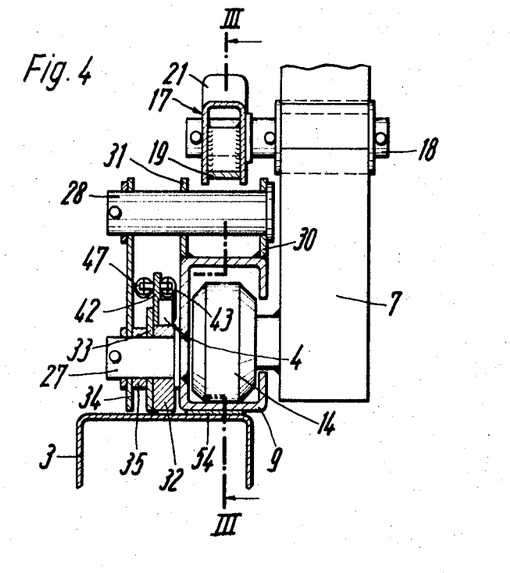
FIG. 4 is a view of the latch system taken along IV—IV of FIG. 3.

As is best seen from FIG. 4, the rail 9 is provided with two mutually parallel and longitudinally extending webs 30 and 31 which are transversely spaced apart and are secured to the upper edges of the rail 9 by welding. The indexing pin 26 passes through a pair of registering bores in the webs 30 and 31 and so is stationary with respect to the rail 9.

Figure 2:
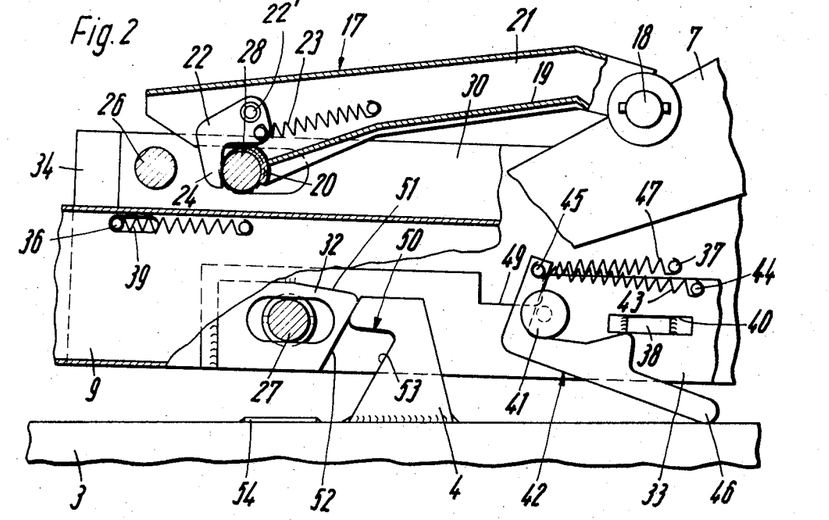
FIG. 2 is a detail vertical section through a latch system in its released condition corresponding to a tilting movement of the beam.
Figure 7:
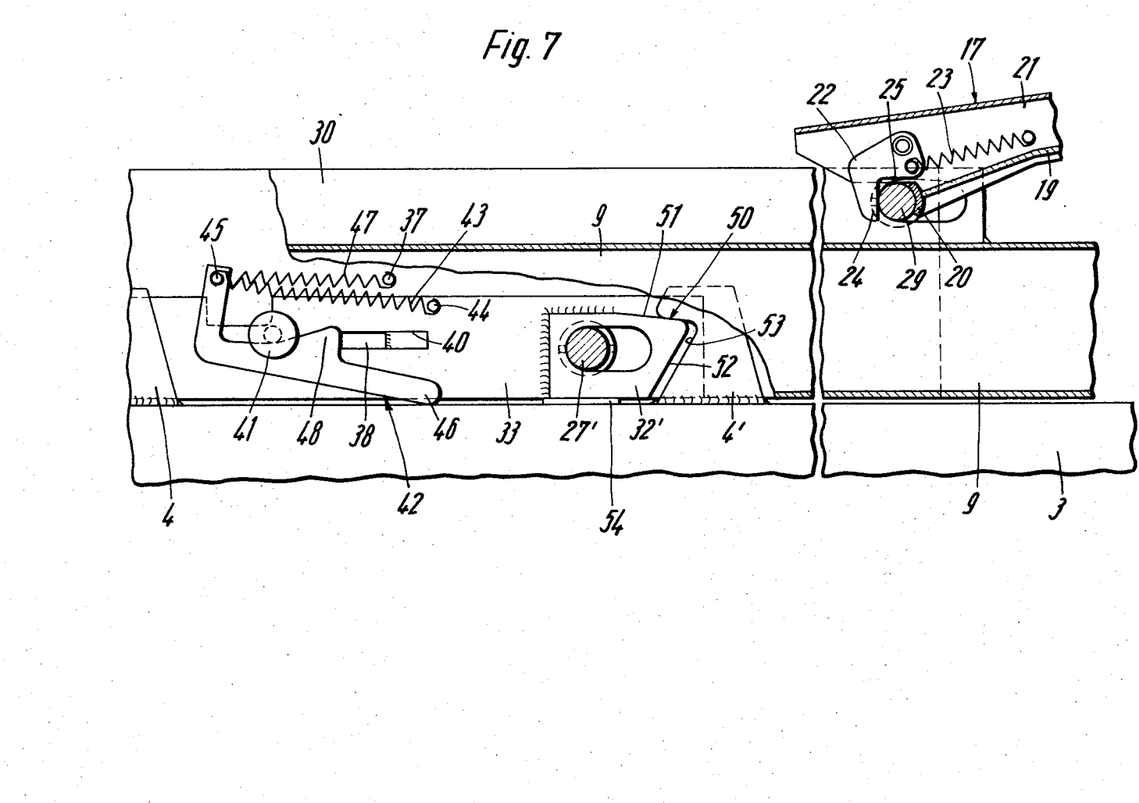

The guide pins 27 and 27' are each rigidly fixed in the rear surface or web of the rail 9 and extend parallel to indexing pin 26 while passing through a pair of guide plates 32 or 32' via respective longitudinally extending slots therein. The guide plastes 32 and 32', as best seen in FIGS. 2, 4 and 7, are rigidly connected to an outer slider 33 and, therefore, to an inner slider 34 held at a predetermined spacing from the outer slider 33 by spacer disks or washers 35.

The inner slider 34 is rigidly connected with the operating pins 28 and 29 which, in turn, are longitudinally shiftable in respective slots formed in the webs 30 and 31. The guide plates 32 and 32', moreover, form slide bolts respectively engageable with the hooks 4 and 4' mentioned earlier and best seen in FIG. 7.

Figure 3:
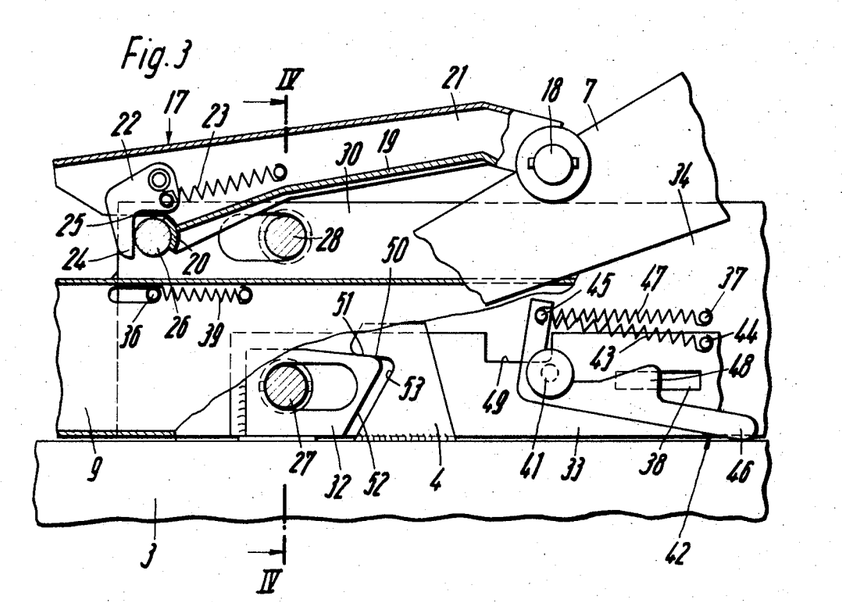
FIG. 3 is a view similar to FIG. 2 but taken along the line III — III of FIG. 4, showing the beam locked against tilting.

The inner slider 34 also carried a pair of studs 36 and 37 and is provided with a cam arrangement 38 in the form of a notch or recess. The stud 36 passes through a longitudinally extending slot in the wall of rail 9 and forms an anchor for one end of a tension spring 39 whose other end is anchored to the rail (see FIGS. 2 and 3). The spring biases the inner slide 34 to the right, i.e., toward the rearward end of the limb 3.

The control cam 38, which forms an indexing notch, passes through a rectangular longitudinally extending slit 40 in the outer slide 33. The position of this slit 40 is so established with respect to the elongated windows traversed by the guide pins 27 and 27' of bolts 32 and 32' and the inner slider and stud 36, that the cam 38 is brought to bear on the extreme right-hand end of its longitudinal slit 30 when the pin 36 engages its right-hand end of its slot and guide pins 27 and 27' engage the left-hand ends of the respective slots of the bolts 32, 32' (see FIG. 3).

The outer slide 33 is provided with a knob-like head 41 connected by an arrow neck with the outer slider 33 and engaged by a control lever 42 under the influence of a tension spring 43. One end of the tension spring 43 engages a stud 44 projecting laterally from the outer slide while the other end engages a stud 45 on the outer end of a short arm of lever 42 which thus is fulcrumed on know 41, the fulcrum floating with respect to the lever (compare FIGS. 2 and 7). The longer arm of lever 42, which forms a right angle with the short arm, bears with its outer edge 46 upon the upper surface of the limb 3. A further tension spring 47, which is tied to the stud 45 at one end, engages with its other end a stud 37 of an inner stud 34. On the upper side of the long lever arm of member 42 is a projection 48 cooperating with the cam 38 and so dimensioned and positioned that it lies ahead of the cam notch 38 so that it can urge the lever and the inner slider to the left (forwardly) as long as the rail 9 rests upon the limb 3. When the rail 9 is elevated, the lver 42 swings in the clockwise sense (FIG. 2) to release the cam 38 and decouple the slider. To limit the clockwise swing of lever 42 under the influence of springs 43 and 47, a stud 45 is provided to engage the edge of member 33 and projects to this end laterally from the lever 42 to a sufficient extent. The sud 45 thus comes to rest on the upper edge on the outer slide 33. A rectangular cutout 49 along the upper edge of this outer slide 33 permits the stud 45, as will be apparent hereinafter, to allow a further downward movement of the lever 42 relative to its fulcrum 41.

As is also seen from the drawing, the bolts 32 and 32' lie in the same vertical plane as the locking hooks 4 and 4' of the limb 3. The bolts are shaped to conform to the inner configuration of the hooks and preferably have interengaging faces which include small acute angles with the longitudinal direction. The lower locking surface 51 of hook 4, for example, thus includes a small acute angle with the upper surface of limb 3 and cooperates with the correspondingly inclined upper surface 51 of bolt 32. In the locked condition (FIG. 3 or FIG. 5) the surfaces 52 and 53, which are inclined to the limb 3 at larger acute angles, maintain a spacing to insure a wedge-like interfitting of the bolt and hook, the surfaces 50 and 51 frictionally interengaging.

c. OPERATION

A. Container Pickup and Transport

For lifting a container 11 from the ground, the vehicle is backed toward the container until its limbs 3 straddle the container with the scissor linkages 6, 7 as previously lowered, so that the upper ends of these links lie below the laterally projecting rim 10 of the container.

The hydraulic jack 8 is then pressurized to elevate the linkages 6, 7 whereby the upper link 7 engages in the fork 15 while its lower end, carrying the roller 14, shifts rearwardly in the rail 9 (FIG. 1) simultaneously, the lower end of link 6 swings about the pivot 16 in the clockwise sense relative to the rail 9 and its upper end, via roller 33, shifts to the right along the underside of the rim 10. The container is thereby lifted from the ground.

Shortly before the container 11 is raised to its transport height, the nose 24, which has been drawn to the right or rearwardly via the control member 17 and the lower end of link 7, encounters the indexing pin 26 since the nose 25 projects some 10 mm below the underside of the control member 17. The pawl 22 is thereby swung in the clockwise sense against the force of spring 23 as the control member 17 continues its rearward movement. This displacement of the pawl 22 continues until the seat 20 of the support member 19 extending through the housing 21 of control member 17 is cleared to receive a pin. The control member 17, which had previously risen in a clockwise sense upon the pin 26, then descends in the counterclockwise sense until its edge 25 rests upon the pin 26. As soon as the pin 26 lies opposite the seat 20 of the support member 19, the operator deactivates the hydraulic jack 8. Under the load of the container 11 and without any substantial resistance in the hydraulic network, the linkage 6, 7 sinks so that the lower end of link 7 is shifted forwardly, i.e., to the left of FIG. 3. The control member 17 is likewise shifted forwardly (to the left) until the seat 20 bears against pin 26. The pin 26 thus transfers a part of the vertical component of the weight of the container 11 via the webs 30 and 31 to the rail 9 and via the bearing plate 54 to the limb 3 of vehicle frame 1. The remainder of the vertical component of the weight of container 11 which is supported by link 7 is applied by a roller 14 to the rail 9 directly. The horizontal component of the weight of container 11 is likewise applied to webs 30 and 31 and transferred by these members to the rail 9 to which they are welded. With the weight taken up fully by the rail 9 and the associated limb 3, the hydraulic jack 8 is under no pressure and the vehicle can be used to transoort the container.

B. Dumping

To initiate a dumping of the contents of the container by a rearward tilting of the latter, the hydraulic jack 8 is again actuated. The lower end of link 7 and the roller 14 thereof shift rearwardly together with control member 17. The support arm 19 thereupon rides over the pin 26, the pawl 22 being further deflected in the clockwise sense. The movement of the control member 17 continues to the right (rearwardly with respect to the vehicle) until the control member rides over the operating pin 28 and the linkages 6, 7 have been raised to their maximum height.

At this point, the control member 17 rides up upon the second operating pin 29 (FIG. 7) whereupon the lower end of nose 24 engages this pin and is deflected in the clockwise sense, as described with respect to the elevating operation. The control member 17 thereupon sinks in the counterclockwise sense under its weight until the edge 25 comes to rest upon the pin 29.

The pin 29 thereupon lies in juxtaposition with the seat 20 so that, when the operator cuts off the hydraulic jack 8, the weight upon the linkages of the container 11 shifts the lower end of link 7 to the left (FIG. 7) to bring the seat 20 into abutting relationship with the pin 29.

Figure 6:
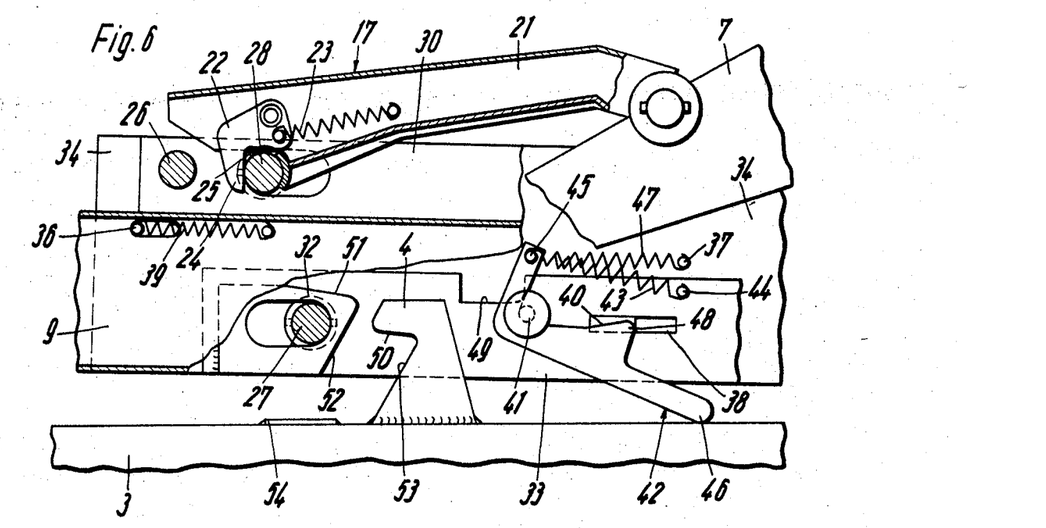

The forward longitudinal component of force applied to the pin 29 to the left (FIG. 7) causes the inner slide 34 to move forwardly, i.e., to the left through a stroke which terminates when the pins 28 and 29 bear fully upon the left-hand ends of their respective slots in webs 30 and 31 (FIGS. 6 and 7). During this movement, the tension spring 29 and tension spring 43 are expanded or stressed since the control cam 38 of licking lever 32 is shifted along with slide 34, and outer slide 33 is not able to follow this motion (FIG. 7).

At the same time that the aforedescribed illustrated mechanical motion takes place, a relationship is established between the forces acting on the system which is not visible from the drawing. As long as the hydraulic jack 8 is under pressure, the roller 14 bears upon the upper surface of rail 9 in an upwardly direction. The upward force upon the rail 9 relative to the limb 3 acts to increase the frictional force with which the bolt 32 or 32' at surface 51 engages the complementary surface or the hook 4 or 4'. This frictional force between the surfaces 50 and 51 is so great that it cannot be exceeded by the force of tensioned spring 43. This situation reverses when, upon cutoff of the hydraulic jack 8 and lowering of the elevating assembly, the pin 28 or 29 comes to the end of its longitudinal slot. A portion of the container weight is thus delivered to the rail 9 and urges the latter against the limb 3. Roller 14 bears downwardly upon the rail 9 and the upper friction surfaces 50 and 51 engage with a minimum of force. Spring 43 is, in this case, able to shift the outer slider 33 together with its bolt 32 or 32' into its forward position in which each bolt is removed from the hook 4 or 4'. If the hydraulic jack 8 is then pressurized again, the roller 14 bears upon the upper side of the rail 9 which swings freely about its axis 12 to allow a tilting movement of the container (FIG. 6).

During this tilting operation, the piston of hydraulic jack 8 is brought into its limiting outward position and the rails 9 are rotated clockwise to dump the contents of the container. The long arm of latch 42 is freed from engagement with the limb 3, (see FIG. 6) and swings under the influence of springs 43 and 47 until its projection 48 passes out of juxtaposition with the entrainment portion of control cam 38. In addition, the latch lever 42 slides with its outer edge 46 along the limb 3 until it is fully released. As a result of the disengagement of the cam 38 from the projection 48 of the latch lever, tension spring 47 shifts the outer slide 33 slightly forth to the right, i.e., rearwardly (FIG. 2). While the tilting movement has been described as it takes place with the container 11 in its upper position (corresponding to pin 29), it will be understood that a similar sequence of movement is effective when it is desired to tilt the container in its lower position of elevation corresponding to pin 28.

C. Return of the Container

To return the container 11 to its starting position, the hydraulic jack is de-energized. Under the effect of its weight, the container 11, the elevating assembly 6, 7 and the rail 9 swing in the counterclockwise sense about the pivot 12 and 16 downwardly. The control latch 42 thereupon comes to bear with its edge 46 upon the frame limb 3 and is swung about the fulcrum formed by the know 41. Its projection 48 thereupon engages the underside of control cam 38 which forms a fulcrum for the latch member 42. The stud 45 thereupon swings into the cutout 49 as the short arm of lever 42 swings increasingly downwardly and as the rail 9 more closely approaches the limb 3 of the frame.

We claim:

1. In a vehicle for the transportation, stacking and tilting of a container having a rim, said vehicle comprising a bifurcated chassis having a pair of parallel longitudinally extending limbs adapted to straddle said container, respective longitudinally extending beams on said limbs and pivotally secured thereto for swinging movement relative to said limbs, respective elevating assemblies on said limbs having upper ends engageable with said container and lower ends movable relative to said limbs, and power means for raising and lowering said assemblies, the movement which comprises a respective catch releasably securing each of said beams to the respective limb and actuating means on the respective assembly cooperating with said cath for releasing and engaging same, each catch comprising a pair of latching hooks spaced apart along the respective limb and secured thereto, respective bolts longitudinally slidable on the beam and engageable with said hooks, respective operating pins on said beam operatively coupled with said bolts, and a control member longitudinally shiftable with the respective assembly upon replacement thereof by said power means and under the weight of said container and engageable selectively with said pins for controlling the engagement and disengagement of said bolts with the respective hooks in various elevations of said assemblies and the container carried thereby.

2. The improvement defined in claim 1 wherein each of said beams forms a guide rail extending longitudinally along the respective limb, said assemblies each including a link guided in the respective rail, said control member being articulated to the respective link for pivotal movement relative thereto about an axis transverse to the direction of travel of said vehicle, a first slider longitudinally displaceable along said rails and connected with one of said pins, and a second slider operatively connected to said bolts and resiliently connected to said first slider.

3. The improvement defined in claim 2 wherein said second slider is mounted on an outer side of said rail and said first slider is mounted on an inner side of said rail, further comprising first spring means interconnecting said sliders, said outer slider being displaceable solely in the longitudinal direction relative to said rail, said pins being limitedly displaceable on said rails in the longitudinal direction thereof, said pins being provided with second spring means resisting longitudinal displacement of the pins.

4. The improvement defined in claim 3 wherein each assembly is a scissor linkage and said control member of each assembly is articulated at the lower end of one of the links of the scissor linkage for pivotal movement relative thereto, said control member being formed with an outwardly directed pin seat and a lower edge forming a right angle therewith and adapted to glide over said pins, said control member further comprising a control pawl pivotally mounted thereon remote from the articulation of said control member with its link and adjacent said seat, said pawl having a nose lying ahead of said seat and projecting beneath said lower edge, said control member further including a spring biasing said pawl toward said seat.

5. The improvement defined in claim 4 wherein said nose projects substantially 10 mm beneath said edge.

6. The improvement defined in claim 4 wherein said nose has a back forming an acute angle with the longitudinal axis of said control member upon engagement of said nose with said seat to provide a surface enabling said control member to glide over said pins.

7. The improvement defined in claim 4 wherein said second spring means including a tension spring anchored to said rail and connected to said inner slider such that actuation of said bolts by said control member tensions said tension spring.

8. The improvement defined in claim 7 wherein said outer slider is provided with a fulcrum, said improvement further comprising a control latch lever rockable about said fulcrum and having a short lever arm and a long lever arm, said first spring means including a pair of tension springs connected to said short lever arm and to said inner slider and outer slider respectively and effective to bias said control latch lever in one direction. A control cam extending transversely from said inner slider and engageable with said control latch lever under the bias applied thereto by said first spring means, said long lever arm bearing against the respective limb and disengaging said control latch lever from said cam upon displacement of said rail relatively thereto.

9. The improvement defined in claim 1 wherein each latching hook has a lower latching surface forming an acute angle with the upper surface of the respective limb, the corresponding bolt being formed with an inclined upper latching surface frictionally engaging said lower latching surface.

10. The improvement defined in claim 1 wherein said rail is provided with a pair of spaced-apart guide pins, each of said bolts being provided with a slot receiving a respective one of said guide pins.

* * * * *